INVENTOR:

ALFRED JOHN AINLEY

BY Pillars and Buyer
ATTORNEYS

3,176,110
ELECTRIC INDUCTION HEATING DEVICES
Alfred John Ainley, Manchester, England, assignor to Associated Electrical Industries Limited, London, England, a British company
Filed Oct. 15, 1962, Ser. No. 230,487
Claims priority, application Great Britain, Nov. 3, 1961, 39,422
5 Claims. (Cl. 219—10.49)

This invention relates to induction heating devices and aims at providing an improvement to ensure a desirable overall efficiency, also an economical construction of the device, where it is not possible to place the object to be heated within an opening or eye of induction windings.

Accordingly this invention resides in an electric heating device comprising induction windings, at least two core members, and an electrically insulating partition between the core members, said core members having recesses, the induction windings being accommodated in the recesses, the recesses having openings in an end face of the device, and said end face being shaped to conform to the end face of an object to be heated by the device.

Each core member preferably comprises a steel block having the face with the recess opening machined to ensure that the magnetic flux concentrating at the open end of the core member enters through the contacting surfaces the object to be heated by the device.

One or more devices according to the invention may be used with their end faces contacting the end faces of a tool or die which itself serves to heat and shape thermoplastic material, of the synthetic resin kind for instance. In a particular embodiment the tool may comprise an extruding die.

Figure 1:
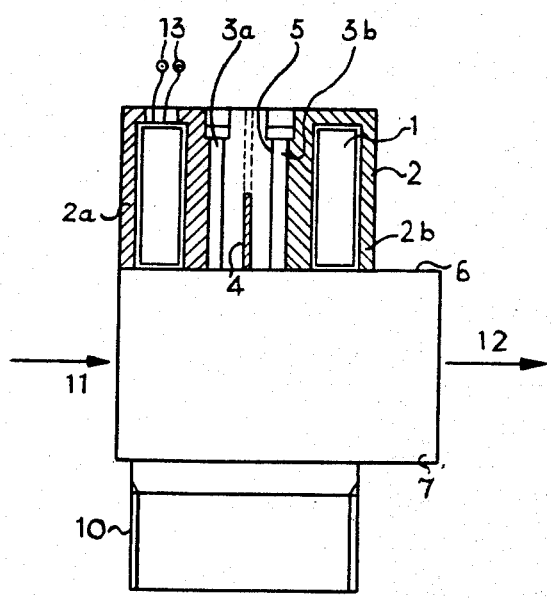
Figure 2:
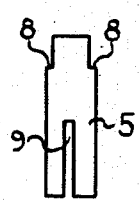

More details will become apparent and the invention will be better understood from the following description referring to the accompanying drawings, in which, FIG. 1 shows diagrammatically and by way of example a device according to the invention in combination with an extruder tool for covering wire with plastic insulating material, and FIG. 2 shows a detail.

Referring to FIG. 1 the device comprises a magnetic core 2 composed of two identical halves 2a, 2b. Each half has a recess of semi-circular cross-section to receive induction windings 1, connectible through terminals 13 to a suitable A.C. source. The core members are separated from each other by a partition comprising a board or sheet of electrically insulating material 4 which is heat resisting, such as asbestos board. The core members are individually fastened by bolts or screws 3a, 3b to a planar top surface 6 of a tool or die 7 of electrically conducting and preferably ferro-magnetic material, such as steel which constitutes an intermediary member between the core 2 and an object to be heated. An insulating sheet 5, similar to the sheet 4 and of similar material, is arranged at right angles to the sheet 4, to serve the same purpose, namely preventing induced current flow. Both boards or sheets 4, 5 are slotted to inter-lock each other, and slots in the core members are provided to hold the sheet 5 in position.

As will be seen from FIG. 2, the element 5 has shoulders 8 which fit under the heads of the screws 3a, 3b, and has a slot 9 to receive a part of the separating sheet 4 which is positioned, preferably near the open ends of the members 2a, 2b, and adjacent the surface 6. The upper portion of the separating sheet 4 is slotted to receive the upper portion of the element 5.

The extruding tool 7 has a coupling end 10 for connection to the chamber of an extruding machine. The tool is shaped in a known manner to receive bare wire at its left-hand end as indicated by the arrow 11, plastic material being also fed to the tool from end 10, and "plastic covered" wire leaves the right-hand tool end, as indicated by the arrow 12. The under-side, left-hand and right-hand ends of the tool 7 are not readily accessible to allow direct heating, but an induction heating device according to the invention can be readily secured not only to the top as shown, but also to two side faces which are parallel to the plane of the drawing.

A major portion of the heat is generated in the tool 7 which forms an intermediary member functioning as a secondary winding and also as a core portion as it is of soft magnetic material and receives flux from the device(s). Thus overheating of the induction windings 1 and their insulation can be readily avoided. For the same reason the heating efficiency is increased as compared with that of customary devices, and smaller induction coils can be used.

Modifications are possible without departing from the invention. The core members could be laminated but in practice it is more convenient to use integral core members whose faces can be readily machined to reduce to a minimum the air gap between the device and an object to be heated. The induction winding may comprise two or more coils in parallel or series connection.

What I claim is:

1. An electric induction heating device having two core members of ferro-magnetic material, a solid partition of electrically insulating material separating the two core members, each core member having a slot positioned at right angles to the said partition, and a second insulating partition being provided in said slot, a substantially continuous surface being formed by portions of said core members, an intermediary member of ferro-magnetic material being arranged to contact with one surface portion an object to be heated and with another surface portion the said continuous surface, a continuous recess in said continuous surface, and a winding connectible to an alternating current source being accommodated in said continuous recess.

2. A device as claimed in claim 1, wherein the two partitions comprise each a board with a slot and each board projects into the slot of the other board for interlinking the two boards.

3. A device as claimed in claim 1, wherein the axis of the winding is parallel to the solid partition and is at right-angles to the continuous surface formed by the two core members.

4. A device as claimed in claim 1, wherein the intermediary member is shaped as a tool for extruding plastic material.

5. A device as claimed in claim 1, wherein the intermediary member comprises a tool for covering wire with insulating thermo-plastic material.

References Cited by the Examiner
UNITED STATES PATENTS

| | | | |
|---|---|---|---|
| 1,335,453 | 3/20 | Nilson | 219—10.79 X |
| 1,739,617 | 12/29 | Shaw | 219—10.49 |
| 2,537,289 | 1/51 | Van Embden | 219—10.49 X |
| 2,810,053 | 10/57 | Messner | 219—10.79 |

RICHARD M. WOOD, *Primary Examiner.*

ANTHONY BARTIS, *Examiner.*